(12) United States Patent
Smith et al.

(10) Patent No.: US 12,365,989 B2
(45) Date of Patent: Jul. 22, 2025

(54) PHOSPHATE COATING WHICH CAN BE SUBSTANTIALLY FREE OF HEXAVALENT CHROMIUM AND METHODS OF MAKING THE SAME

(71) Applicant: Hamilton Sundstrand Corporation, Charlotte, NC (US)

(72) Inventors: Blair A. Smith, South Windsor, CT (US); Steven Poteet, Ashland, MA (US); Vijay V. Pujar, Rancho Santa Fe, CA (US); Georgios S. Zafiris, Glastonbury, CT (US); Weilong Zhang, Glastonbury, CT (US); Michael A. Kryzman, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 910 days.

(21) Appl. No.: 17/131,972

(22) Filed: Dec. 23, 2020

(65) Prior Publication Data
US 2022/0195604 A1   Jun. 23, 2022

(51) Int. Cl.
*C23C 22/82* (2006.01)
*C23C 22/18* (2006.01)
(Continued)

(52) U.S. Cl.
CPC ............ *C23C 22/182* (2013.01); *C23C 22/76* (2013.01); *C23C 22/83* (2013.01); *C23C 28/34* (2013.01); *C23F 11/188* (2013.01)

(58) Field of Classification Search
None
See application file for complete search history.

(56) References Cited

U.S. PATENT DOCUMENTS

| 10,465,292 B2 | 11/2019 | Kryzman et al. |
| 10,479,896 B2 | 11/2019 | Kryzman et al. |

(Continued)

FOREIGN PATENT DOCUMENTS

| CN | 104357823 A | * 2/2015 | ............ C23C 22/44 |
| EP | 0256908 A1 | 2/1988 | |

(Continued)

OTHER PUBLICATIONS

European Search Report for Application No. 21215276.3, mailed May 2, 2022, 7 pages.

(Continued)

*Primary Examiner* — Lois L Zheng
(74) *Attorney, Agent, or Firm* — CANTOR COLBURN LLP

(57) ABSTRACT

Disclosed is a phosphate coating, comprising: a phosphate portion, wherein the phosphate portion comprises pores, wherein the pores are at least partially filled with a corrosion inhibition sealant, wherein the corrosion inhibition sealant comprises: a base, wherein the base comprises a matrix and a metal within the matrix, wherein the metal within the matrix comprises aluminum, an aluminum alloy, zinc, a zinc alloy, magnesium, a magnesium alloy, or a combination thereof and an inhibitor mixed within the base, wherein the inhibitor comprises zinc molybdate, magnesium metasilicate, trivalent chromium, tungstenate, a metal phosphate silicate, or a combination thereof.

14 Claims, 2 Drawing Sheets

(51) Int. Cl.
*C23C 22/76* (2006.01)
*C23C 22/83* (2006.01)
*C23C 28/00* (2006.01)
*C23F 11/18* (2006.01)
*C23C 22/07* (2006.01)

(56) References Cited

U.S. PATENT DOCUMENTS

| | | |
|---|---|---|
| 10,760,164 B2 | 9/2020 | Ding et al. |
| 2013/0139930 A1 | 6/2013 | Wagh et al. |
| 2020/0181424 A1* | 6/2020 | Zhu ..................... C09D 5/086 |
| 2020/0189975 A1 | 6/2020 | Wagh |
| 2020/0199757 A1* | 6/2020 | Aujla ..................... C23C 22/42 |

FOREIGN PATENT DOCUMENTS

| | | |
|---|---|---|
| WO | 2011075712 A2 | 6/2011 |
| WO | 2011075712 A3 | 6/2011 |
| WO | 2018193223 A2 | 10/2018 |
| WO | 2018193223 A3 | 10/2018 |
| WO | 2018193223 A8 | 10/2018 |

OTHER PUBLICATIONS

T.S.N. Sankara Narayanan, "Surface Pretreatment by Phosphate Conversion Coatings-A Review", Reviews on Advanced Materials Science, vol. 9, 2005, 48 pages.

* cited by examiner

PHOSPHATE COATING WHICH CAN BE SUBSTANTIALLY FREE OF HEXAVALENT CHROMIUM AND METHODS OF MAKING THE SAME

BACKGROUND

Exemplary embodiments pertain to the art of phosphate coatings, more particularly, to phosphate coatings which can be substantially free of hexavalent chromium and are applied to aircraft components.

Alloys require corrosion protection in aerospace applications. Conventional sacrificial corrosion inhibition coatings for high operating temperatures are based on aluminum-ceramic paints with hexavalent chromium compound additives as corrosion inhibitors. However, hexavalent chromium-containing compounds are considered environmental hazards. In addition, chromium-free compounds can lack certain needed corrosion inhibition properties.

Furthermore, phosphate coatings are used on ferrous substrates to promote primer adhesion and enhance corrosion inhibition. They also provide a base to hold lubricants in place. Unfortunately, to make them function properly (i.e., prevent corrosion and promote adhesion) all the specifications used to apply phosphate coatings require an environmentally unfriendly chromic acid rinse post-treatment.

Therefore, there is a need to develop a phosphate coating which can be substantially free of hexavalent chromium with equal or better corrosion inhibition properties as compared to conventional hexavalent chromium-containing compounds.

BRIEF DESCRIPTION

Disclosed is a phosphate coating, comprising: a phosphate portion, wherein the phosphate portion comprises pores, wherein the pores are at least partially filled with a corrosion inhibition sealant, wherein the corrosion inhibition sealant comprises: a base, wherein the base comprises a matrix and a metal within the matrix, wherein the metal within the matrix comprises aluminum, an aluminum alloy, zinc, a zinc alloy, magnesium, a magnesium alloy, or a combination thereof; and an inhibitor mixed within the base, wherein the inhibitor comprises zinc molybdate, magnesium metasilicate, trivalent chromium, tungstenate, a metal phosphate silicate, or a combination thereof.

Also disclosed is a substrate coated with the phosphate coating.

Also disclosed is method of forming a phosphate coating, comprising: applying a solution of phosphoric acid and phosphate salt to a surface of a substrate, wherein the solution chemically reacts with the surface of the substrate and forms a phosphate portion, wherein the phosphate portion comprises pores; and applying a corrosion inhibition sealant to the phosphate portion, wherein the pores of the phosphate portion are at least partially filled with the corrosion inhibition sealant, wherein the corrosion inhibition sealant comprises: a base, wherein the base comprises a matrix and a metal within the matrix, wherein the metal within the matrix comprises aluminum, an aluminum alloy, zinc, a zinc alloy, magnesium, a magnesium alloy, or a combination thereof; and an inhibitor mixed within the base, wherein the inhibitor comprises zinc molybdate, magnesium metasilicate, trivalent chromium, tungstenate, a metal phosphate silicate, or a combination thereof.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
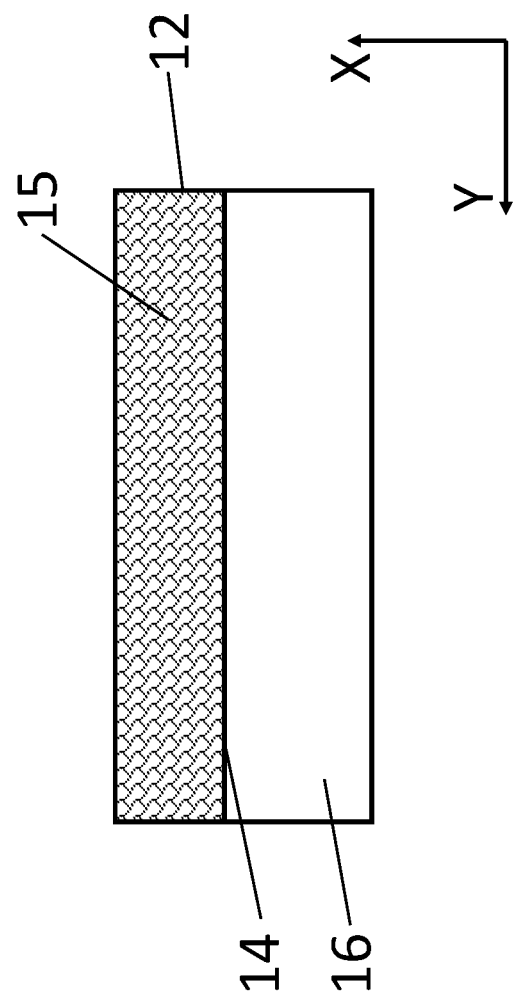
FIG. 1 is a cross-section of a phosphate coating according to an exemplary embodiment.

Referring to FIG. 1, a phosphate coating 12 is coated on a surface 14 of a substrate 16. The phosphate coating 12 comprises a phosphate portion, wherein the phosphate portion comprises pores 15, wherein the pores 15 are at least partially filled with a corrosion inhibition sealant. The phosphate portion can comprise iron phosphate, manganese phosphate, zinc phosphate, or a combination thereof.

In addition to the corrosion inhibition sealant, the pores 15 of the phosphate portion can also be at least partially filled with paint, oil, wax, lubricant, film, or a combination thereof. For example, precipitation films are chemicals forming insoluble protective films by reaction with soluble species in the environments (e.g., phosphonates and polyphosphates, forming protective films with calcium ions in solution) or with the protected metal ions. Iron phosphates can be applied to a substrate 16 by, for example, any suitable immersion or spraying technique. Iron phosphate pores can be further filled with, for example, paints. Manganese phosphates can be applied to a substrate 16 by, for example, any suitable immersion technique. Manganese phosphate pores can be further filled with, for example, oils and lubricants. Zinc phosphates can be applied to a substrate 16 by, for example, any suitable immersion or spraying technique. Zinc phosphate pores can be further filed with, for example, oils, lubricants, and paints.

The corrosion inhibition sealant can comprise an inhibitor mixed within a base. The corrosion inhibition sealant can be substantially free of hexavalent chromium. The corrosion inhibition sealant can have equal or better corrosion inhibition properties as compared to conventional hexavalent chromium-containing compounds. The corrosion inhibition sealant can function in a wide range of applications, environments, and temperatures. The corrosion inhibition sealant is also environmentally friendly. The corrosion inhibition sealant can inhibit the corrosion of metal, thereby extending the lifetime of a substrate 16.

The corrosion inhibition sealant can comprise a base comprising a matrix and a metal within the matrix. The matrix can comprise any suitable silicate, epoxy, polyurethane, ceramic, or a combination thereof. The metal within the matrix can comprise aluminum, an aluminum alloy, zinc, a zinc alloy, magnesium, a magnesium alloy, or a combination thereof.

The corrosion inhibition sealant can also comprise an inhibitor. For example, the inhibitor can comprise zinc molybdate ($ZnMoO_4$), magnesium metasilicate ($MgSiO_3$), trivalent chromium, tungstenate, a metal phosphate silicate, or a combination thereof. The metal phosphate silicate of the inhibitor can comprise aluminum phosphate silicate, zinc phosphate silicate, calcium phosphate silicate, strontium phosphate silicate, or a combination thereof. The inhibitor can be in the form of a powder.

The corrosion inhibition sealant can comprise about 1% to about 99% base by volume and about 1% to about 99% inhibitor by volume. For example, the corrosion inhibition sealant can comprise about 70% to about 95% base by volume and about 5% to about 30% inhibitor by volume. The corrosion inhibition sealant can comprise about 85% to about 95% base by volume and about 5% to about 15% inhibitor by volume. The corrosion inhibition sealant can comprise less than or equal to about 50% inhibitor by volume. For example, the corrosion inhibition sealant can comprise less than or equal to about 10% inhibitor by volume.

According to an embodiment, the inhibitor can comprise, for example, about 0% to about 100% zinc molybdate by weight; about 0% to about 100% magnesium metasilicate by weight; and about 0% to about 100% of a metal phosphate silicate by weight. For example, the inhibitor can comprise about 1% to about 50% zinc molybdate by weight; about 1% to about 50% magnesium metasilicate by weight; and about 1% to about 50% of a metal phosphate silicate by weight. For example, the inhibitor can comprise about 25% zinc molybdate by weight; about 25% magnesium metasilicate by weight; and about 25% of a metal phosphate silicate by weight.

According to an embodiment, the inhibitor can comprise, for example, about ⅓ zinc molybdate by weight; about ⅓ magnesium metasilicate by weight; and about ⅓ of a metal phosphate silicate by weight. The inhibitor can comprise about 50% zinc molybdate by weight; and about 50% magnesium metasilicate by weight. In one embodiment, the inhibitor can also consist of only three components, for example, the zinc molybdate, the magnesium metasilicate, and the metal phosphate silicate.

According to an embodiment, the corrosion inhibition sealant can be substantially free of hexavalent chromium. Substantially free of hexavalent chromium can refer to less than or equal to about 1.0% hexavalent chromium by weight based on a total weight of the phosphate coating, for example, less than or equal to about 0.5%, for example, less than or equal to about 0.1%, for example, less than or equal to about 0.01%, for example, 0%.

The curing temperature of the corrosion inhibition sealant will vary depending on the matrix used. For example, curing temperatures can be different for silicate, epoxy, and ceramic matrices. Curing duration can also vary with curing temperature. For example, if a higher curing temperature is used, less curing time is required. For example, curing temperatures can be about 20° C. to about 200° C.

Referring to FIG. 1, the phosphate coating 12 can be coated onto a surface 14 of a substrate 16. For example, the substrate 16 can comprise ferrous metal, an electroplated coating, or a combination thereof. For example, the substrate 16 can comprise an electroplated coating, wherein the electroplated coating comprises cadmium, titanium-cadmium, zinc, nickel, zinc-nickel, zinc-iron, zinc-cobalt, selenium-zinc, tin-zinc, or a combination thereof. The phosphate coating 12 can function in a wide range of applications and environmental temperatures. The phosphate coating 12 is applicable to all commercial steel products, for example, sheet metal, architectural products, bridges, trains, aircraft, automobiles, construction equipment, or a combination thereof. For example, the substrate 16 can be an aircraft component. For example, the aircraft component can be a propeller blade, a propeller shank, a propeller hub, a propeller barrel, a propeller tulip, a landing gear component, an engine gear, an engine disc, a shaft, for example, an engine shaft, a strut, or a counterweight.

Phosphates are a conversion coating in which a dilute solution of phosphoric acid and phosphate salts is applied via spraying or immersion and chemically reacts with the surface of the part being coated to form a layer of insoluble, crystalline phosphates. Zinc and manganese phosphate coatings are the treatment of iron or steel by immersion in a dilute solution of phosphoric acid and other additives. In the resulting chemical reactions, the surface of the metal is chemically converted to an integral protective layer of insoluble zinc and iron or manganese and iron phosphate crystals.

Figure 2:
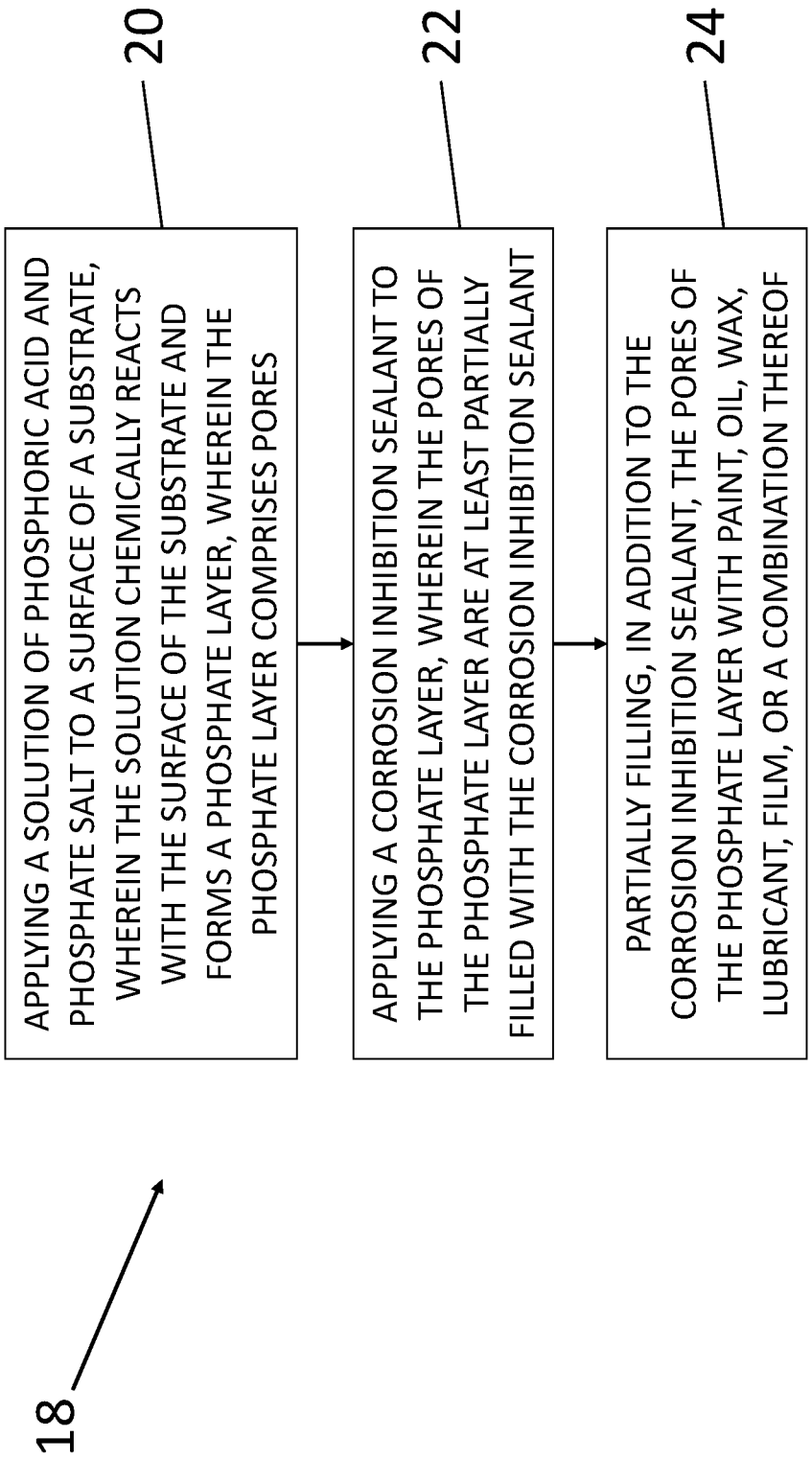
FIG. 2 is a flow diagram of a method of forming a phosphate coating according to an exemplary embodiment.

Now referring to FIG. 2, a method 18 of forming a phosphate coating on a substrate can comprise step 20: applying a solution of phosphoric acid and phosphate salt to a surface of a substrate, wherein the solution chemically reacts with the surface of the substrate and forms a phosphate portion, wherein the phosphate portion comprises pores. Applying the solution can comprise spraying, immersion, or a combination thereof.

The method 18 can further comprise step 22: applying a corrosion inhibition sealant to the phosphate portion, wherein the pores of the phosphate portion are at least partially filled with the corrosion inhibition sealant. In addition to the duration of the phosphating immersion step to control the thickness of the phosphate coating and control the size of the phosphate coating pores and/or microcracks, pH level, temperature, and duration ranges of the sealing step control the precipitation of the inhibitor's ions into the pores and/or microcracks and their surface reaction.

The method 18 can further comprise step 24: wherein, in addition to the corrosion inhibition sealant, the pores of the phosphate portion are also at least partially filled with paint, oil, wax, lubricant, film, or a combination thereof. For example, precipitation films are chemicals forming insoluble protective films by reaction with soluble species in the environments (e.g., phosphonates and polyphosphates, forming protective films with calcium ions in solution) or with the protected metal ions.

The application of phosphate coatings makes use of phosphoric acid and takes advantage of the low solubility of phosphates in medium or high pH solutions. Iron, zinc or manganese phosphate salts are dissolved in a solution of phosphoric acid. When steel or iron parts are placed in the phosphoric acid, an acid and metal reaction takes place which locally depletes the hydronium ($H_3O^+$) ions, raising the pH, and causing the dissolved salt to fall out of solution and be precipitated on the surface. The acid and metal reaction can also create iron phosphate locally which may also be deposited. The porosity allows the additional materials to seep into the phosphate coating and become mechanically interlocked after drying, providing a rough surface for mechanical gripping of the paint or other coating for an improved bond.

Set forth below are some embodiments of the foregoing disclosure:

Embodiment 1. A phosphate coating, comprising: a phosphate portion, wherein the phosphate portion comprises pores, wherein the pores are at least partially filled with a corrosion inhibition sealant, wherein the corrosion inhibition sealant comprises: a base, wherein the base comprises a matrix and a metal within the matrix, wherein the metal within the matrix comprises aluminum, an aluminum alloy, zinc, a zinc alloy, magnesium, a magnesium alloy, or a combination thereof; and an inhibitor mixed within the base, wherein the inhibitor comprises zinc molybdate, magnesium metasilicate, trivalent chromium, tungstenate, a metal phosphate silicate, or a combination thereof.

Embodiment 2. The phosphate coating of Embodiment 1, wherein the phosphate portion comprises iron phosphate, manganese phosphate, zinc phosphate, or a combination thereof.

Embodiment 3. The phosphate coating of any of the preceding embodiments, wherein the matrix comprises silicate, epoxy, polyurethane, ceramic, or a combination thereof.

Embodiment 4. The phosphate coating of any of the preceding embodiments, wherein the corrosion inhibition sealant comprises about 70% to about 95% base by volume; and about 5% to about 30% inhibitor by volume.

Embodiment 5. The phosphate coating of any of the preceding embodiments, wherein the corrosion inhibition sealant comprises less than or equal to about 10% inhibitor by volume.

Embodiment 6. The phosphate coating of any of the preceding embodiments, wherein the inhibitor consists of zinc molybdate; magnesium metasilicate; and a metal phosphate silicate.

Embodiment 7. The phosphate coating of any of the preceding embodiments, wherein the inhibitor comprises: about 1% to about 50% zinc molybdate by weight; about 1% to about 50% magnesium metasilicate by weight; and about 1% to about 50% of a metal phosphate silicate by weight.

Embodiment 8. The phosphate coating of any of the preceding embodiments, wherein the phosphate coating is substantially free of hexavalent chromium.

Embodiment 9. The phosphate coating of any of the preceding embodiments, wherein the metal phosphate silicate comprises aluminum phosphate silicate, zinc phosphate silicate, calcium phosphate silicate, strontium phosphate silicate, or a combination thereof.

Embodiment 10. The phosphate coating of any of the preceding embodiments, wherein the inhibitor is a powder.

Embodiment 11. The phosphate coating of any of the preceding embodiments, wherein, in addition to the corrosion inhibition sealant, the pores of the phosphate portion are also at least partially filled with paint, oil, wax, lubricant, film, or a combination thereof.

Embodiment 12. A substrate coated with the phosphate coating of any of the preceding embodiments, wherein the substrate comprises ferrous metal, an electroplated coating, or a combination thereof.

Embodiment 13. The substrate of Embodiment 12, wherein the substrate comprises an electroplated coating, wherein the electroplated coating comprises cadmium, titanium-cadmium, zinc, nickel, zinc-nickel, zinc-iron, zinc-cobalt, selenium-zinc, tin-zinc, or a combination thereof.

Embodiment 14. The substrate of any of Embodiments 12-13, wherein the substrate is an aircraft component, wherein the aircraft component is a propeller blade, a propeller shank, a propeller hub, a propeller barrel, a propeller tulip, a landing gear component, an engine gear, an engine disc, a shaft, a strut, or a counterweight.

Embodiment 15. A method of forming a phosphate coating, comprising: applying a solution of phosphoric acid and phosphate salt to a surface of a substrate, wherein the solution chemically reacts with the surface of the substrate and forms a phosphate portion, wherein the phosphate portion comprises pores; and applying a corrosion inhibition sealant to the phosphate portion, wherein the pores of the phosphate portion are at least partially filled with the corrosion inhibition sealant, wherein the corrosion inhibition sealant comprises: a base, wherein the base comprises a matrix and a metal within the matrix, wherein the metal within the matrix comprises aluminum, an aluminum alloy, zinc, a zinc alloy, magnesium, a magnesium alloy, or a combination thereof; and an inhibitor mixed within the base, wherein the inhibitor comprises zinc molybdate, magnesium metasilicate, trivalent chromium, tungstenate, a metal phosphate silicate, or a combination thereof.

Embodiment 16. The method of Embodiment 15, wherein applying the solution comprises spraying, immersion, or a combination thereof.

Embodiment 17. The method of any of Embodiments 15-16, wherein the phosphate portion comprises iron phosphate, manganese phosphate, zinc phosphate, or a combination thereof.

Embodiment 18. The method of any of Embodiments 15-17, wherein the phosphate coating is substantially free of hexavalent chromium.

Embodiment 19. The method of any of Embodiments 15-18, wherein, in addition to the corrosion inhibition sealant, the pores of the phosphate portion are also at least partially filled with paint, oil, wax, lubricant, film, or a combination thereof.

Embodiment 20. The method of any of Embodiments 15-19, wherein the substrate comprises ferrous metal, an electroplated coating, or a combination thereof.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A phosphate coating, comprising:
a phosphate portion, wherein the phosphate portion comprises pores,
wherein the pores are at least partially filled with a corrosion inhibition sealant, wherein the corrosion inhibition sealant comprises:
a base, wherein the base comprises a matrix and a metal within the matrix, wherein the metal within the matrix comprises aluminum, an aluminum alloy, zinc, a zinc alloy, magnesium, a magnesium alloy, or a combination thereof; and an inhibitor mixed within the base, wherein the phosphate coating has less than or equal to about 1.0% hexavalent chromium by weight based on a total weight of the phosphate coating, wherein i) the inhibitor comprises trivalent chromium, tungstenate, or a combination thereof, ii) the matrix comprises polyurethane, or iii) a combination thereof.

2. The phosphate coating of claim 1, wherein the phosphate portion comprises iron phosphate, manganese phosphate, zinc phosphate, or a combination thereof.

3. The phosphate coating of claim 1, wherein the corrosion inhibition sealant comprises:

about 70% to about 95% base by volume; and about 5% to about 30% inhibitor by volume.

4. The phosphate coating of claim 1, wherein the corrosion inhibition sealant comprises less than or equal to about 10% inhibitor by volume.

5. The phosphate coating of claim 1, wherein the inhibitor is a powder.

6. The phosphate coating of claim 1, wherein, in addition to the corrosion inhibition sealant, the pores of the phosphate portion are also at least partially filled with paint, oil, wax, lubricant, film, or a combination thereof.

7. A substrate coated with the phosphate coating of claim 1, wherein the substrate comprises ferrous metal, an electroplated coating, or a combination thereof.

8. The substrate of claim 7, wherein the substrate comprises an electroplated coating, wherein the electroplated coating comprises cadmium, titanium-cadmium, zinc, nickel, zinc-nickel, zinc-iron, zinc-cobalt, selenium-zinc, tin-zinc, or a combination thereof.

9. The substrate of claim 7, wherein the substrate is an aircraft component, wherein the aircraft component is a propeller blade, a propeller shank, a propeller hub, a propeller barrel, a propeller tulip, a landing gear component, an engine gear, an engine disc, a shaft, a strut, or a counterweight.

10. A method of forming a phosphate coating, comprising:

applying a solution of phosphoric acid and phosphate salt to a surface of a substrate, wherein the solution chemically reacts with the surface of the substrate and forms a phosphate portion, wherein the phosphate portion comprises pores; and applying a corrosion inhibition sealant to the phosphate portion, wherein the pores of the phosphate portion are at least partially filled with the corrosion inhibition sealant, wherein the corrosion inhibition sealant comprises:

a base, wherein the base comprises a matrix and a metal within the matrix, wherein the metal within the matrix comprises aluminum, an aluminum alloy, zinc, a zinc alloy, magnesium, a magnesium alloy, or a combination thereof; and an inhibitor mixed within the base, wherein the phosphate coating has less than or equal to about 1.0% hexavalent chromium by weight based on a total weight of the phosphate coating, wherein i) the inhibitor comprises trivalent chromium, tungstenate, or a combination thereof, ii) the matrix comprises polyurethane, or iii) a combination thereof.

11. The method of claim 10, wherein applying the solution comprises spraying, immersion, or a combination thereof.

12. The method of claim 10, wherein the phosphate portion comprises iron phosphate, manganese phosphate, zinc phosphate, or a combination thereof.

13. The method of claim 10, wherein, in addition to the corrosion inhibition sealant, the pores of the phosphate portion are also at least partially filled with paint, oil, wax, lubricant, film, or a combination thereof.

14. The method of claim 10, wherein the substrate comprises ferrous metal, an electroplated coating, or a combination thereof.

* * * * *